July 10, 1934.  H. A. COLVIN  1,965,825

DISCHARGE MEANS FOR DUST COLLECTOR DUCTS

Filed Oct. 5, 1931

Inventor
Hervey A. Colvin

By George B. Willcox
Attorney

UNITED STATES PATENT OFFICE 1,965,825

DISCHARGE MEANS FOR DUST COLLECTOR DUCTS

Hervey A. Colvin, Saginaw, Mich.

Application October 5, 1931, Serial No. 567,039

2 Claims. (Cl. 209—135)

This invention relates to dust collector systems of the type known in the trade as self-clearing and semi-clearing mains wherein air, dust and larger pieces of refuse material accumulated from woodworking and other machines is drawn from the machines through small pipes into a large horizontal tubular duct having a fan to exhaust the dust and lighter particles from the duct and discharge them to a cyclone or separator. The heavier pieces of material drop to the bottom of the duct before they reach the fan and are propelled to a discharge outlet by means of a conveyor within the duct. Usually the discharge opening communicates with a closed chamber in which is maintained the same degree of vacuum as in the duct. The duct may be on the pressure side of the fan instead of the exhaust side if desired.

A system of the kind referred to is shown in patent to Caller No. 1,610,358, December 14, 1926.

My invention consists in the introduction of a new and improved means for removing the dust and heavier materials from the duct without employing the usual sealed delivery chamber for the heavier pieces, thus saving valuable space which would otherwise be occupied by the chamber, and permitting continuous delivery to be made to a place of final disposal.

An object of the invention is to provide a novel rotary pocketed valve in direct communication with the delivery opening of the duct instead of using the usual sealed chamber. Also I provide means to prevent damage, or interruption of the service, by facilitating the discharge of extremely long material pieces that sometimes enter the valve device.

Another object is to provide means for more effectually separating the dust from the heavier material before leaving the system and also to provide means for regulating the degree of fineness or coarseness attained by such separation.

With the foregoing and certain other objects in view, which will appear later in the specification, my invention comprises the devices described and claimed and the equivalents thereof.

In the drawing Fig. 1 is a side elevation of a dust collector system, broken away in part, showing my improvement applied thereto.

Figures 1, 2:
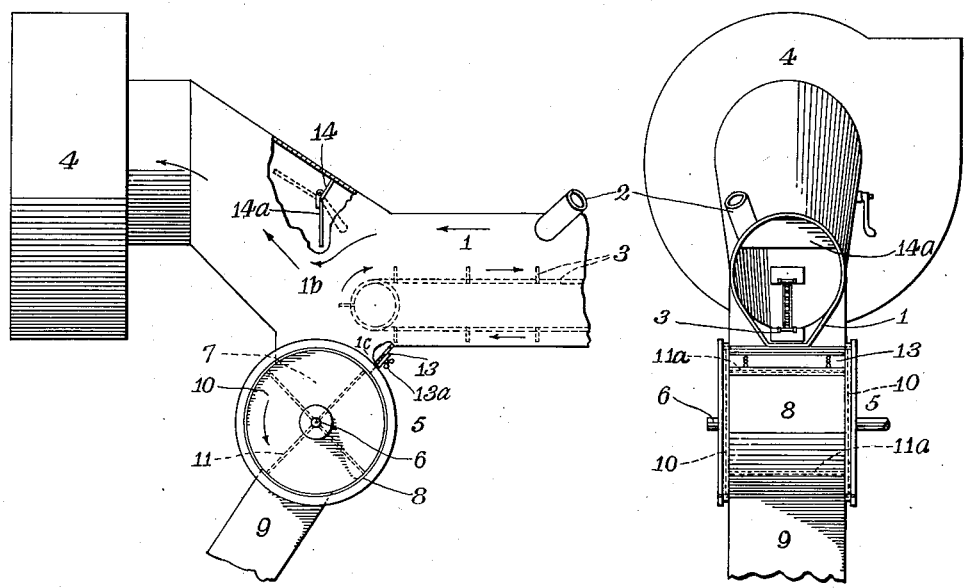
Fig. 2 is an end view.

As is clearly shown in the drawing the duct 1 is supplied with material from machines or other sources, not shown. The material may be led to the duct by means of pipes 2 entering its upper part, or by any other means. In its lower part a flight conveyor 3 or any equivalent kind of material carrier is made to impel the heavier pieces lengthwise the duct.

At the end of the duct 1 is a power-driven exhaust fan 4 which, in known manner, maintains the desired degree of vacuum in the pipes 2 to draw material through them into the duct 1 and also to maintain sufficient air agitation in the duct to keep the dust and finer particles in suspension and cause them to float to the exhaust fan 4.

The heavier material brought by the conveyor 3 drops through a delivery outlet 1a in the bottom of the duct, but instead of falling into a sealed chamber, as heretofore, it is handled by an air-sealed rotary valve device 5 which constitutes a feature of my invention.

Between the outlet 1a and the exhaust fan 4 I extend the duct 1 and preferably enlarge it so as to form a chamber 1b in which the air travels at somewhat less velocity than it does in the duct proper. Reduced air speed causes the heavier particles to drop before reaching the fan. The coarsest or heaviest material, together with the smaller particles thus separated from the dust all drop into a funnel-like throat, the lower end of which is closed by a rotary valve 5 mounted to turn with a horizontal power driven shaft 6 so as to present its pockets 7 in regular order at the bottom of the funnel to receive the material. Valve 5 is enclosed by a throat 1c, a housing 8 and a discharge pipe 9 in such manner as to prevent air from leaking back into the vacuum duct 1 sufficiently to impair the usefulness of the vacuum. Pipe 9 may contain air at atmospheric pressure or at greater or less pressure as desired.

The air seal is maintained by plates 10 fixed to the ends of, say, four radial vanes 11 that extend lengthwise of the housing 8 and are fixed to the shaft 6, so the vanes and plates rotate with the shaft. The vanes 11 are preferably welded along their edges to the end plates 10 to form an integral unit of exceptional rigidity. The V shaped pockets 7 maintain the air seal sufficiently tight for practical purposes while carrying the material around the housing 8 from the throat 1c to discharge chute 9. Some lighter dust material may be entangled with the heavier material that is pushed by the conveyor into the throat. Since it is usually desirable to have the heavier materials free from dust I provide a vent or aperture 12 in the throat 1c and a closure, as slide 13, and slide-adjusting means, as wing nut 13a, to let a greater or less stream of air enter the duct and travel across the path of the material while the material is falling into the pockets 7.

The air admitted through vent 12 may be under atmospheric pressure or else forced in under greater than atmospheric pressure from any source, not shown. This air stream picks up the dust and acts somewhat as a horizontal air baffle that prevents the lighter particles from falling into the throat 1c. The lighter particles are carried by the air stream across the upper end of the delivery opening 1a and into the enlarged chamber 1b. Here their velocity is somewhat lessened and the heavier particles drop down into the delivery opening while the lighter dust goes to the discharge fan 4.

Across the upper part of the enlarged chamber 1b I provide a fixed baffle plate 14 at the bottom of which is an adjustable hinged plate 14a by which the cross sectional area of the enlarged channel can be varied to suit the kind of material and to attain the air velocity desired. The hinged plate 14a may be set to direct the flow of air downward at that place and thus assists the separating process.

Figures 3, 4:
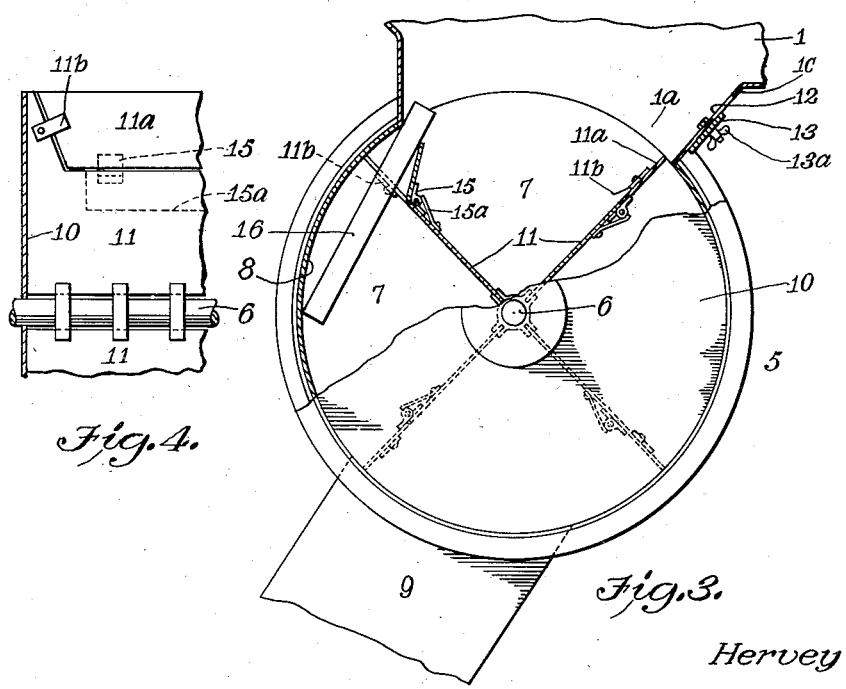
Fig. 3 is an enlarged face view of the sealed rotating valve device partly broken away.
Fig. 4 is a fragmentary detail showing the preferred form of vane structure.

To prevent blocks or long pieces of material from damaging the vanes 11 if caught between them and the housing 8 I provide a novel construction for the vanes 11. Their outer ends 11a are mounted on spring hinges 15 so as to move in one direction only, being kept from moving in the other direction by stops 11b. If a long or oversize piece of material 16 enters the valve and becomes lodged as shown in Fig. 3, the hinged end 11a of the vane folds back sufficiently to permit it to pass the obstruction without damaging the vane or housing. A sheet metal guard 15a covers the hinge so as to prevent material from getting into or catching on it and clogging it. Preferably the hinged parts 11a are beveled at their ends as shown in Fig. 4 to reduce the chance of their being held open by pieces of material.

While I have shown and described valve 5 as being applied to the end of the duct 1, it may equally well be applied anywhere along the length of a straight self-clearing main, or may be installed anywhere along the length of a continuous loop or so-called circuit main, without departing from my invention as claimed.

A certain amount of the material being handled may be initially of the proper size for use, say, as fuel. Other pieces may be too large, requiring to be put through a disintegrating hog in order to reduce them. It is undesirable to load the hog with the finer material that does not require further reducing. It is also undesirable to create a dust nuisance at the hog and, therefore, dust should not be allowed to pass to the hog. Moreover, the fan is protected against having to handle pieces which are so large that they would damage it.

By the means above described I have attained such protection for the fan and a better control of the separation of the dust from the slightly larger pieces, that is, a final separation of the lighter constituents.

Having thus described my invention, what I claim and desire to secure by Letters Patent is:

1. In combination a collector system including a duct, conveyor means therein, an exhaust fan connected to said duct for removing dust and air therefrom, the bottom of said duct formed with an outlet, said duct presenting an enlarged chamber between the outlet and the fan, adjustable baffle means in said chamber located above the path of heavier material passing through the chamber and adapted to direct the flow of air downward, a downwardly directed air-sealed throat communicating with said outlet, and an adjustable aperture in a wall of said throat located adjacent the duct for intake of air in a direction crosswise the throat, said baffle means operable to adjust the velocity of air flow through said enlarged chamber.

2. In a collector system including a duct having conveyor means therein, an exhaust fan connected to said duct for removing dust and air therefrom, the bottom of said duct formed with an outlet, a downwardly directed throat communicating with said outlet, and a housing communicating with the throat below said outlet, in combination a rotary valve in the housing, said valve having radial vanes that extend approximately to the center of the valve to present pockets of large capacity, the outer portions of said vanes being yieldably hinged, whereby to prevent large pieces of material from damaging the vanes.

HERVEY A. COLVIN.